United States Patent Office 3,813,399
Patented May 28, 1974

3,813,399
8-OXYQUINOLINE- AND 8-OXYQUINALDINE ACRYLATES
Helmut Huber-Emden, Basel, Adolf Hubele, Riehen, and Guenter Klahre, Reinach, Basel-Land, Switzerland, assignors to Ciba-Geigy AG, Basel, Switzerland
No Drawing. Filed Feb. 9, 1971, Ser. No. 114,069
Claims priority, application Switzerland, Feb. 13, 1970, 2,138/70
Int. Cl. C07d 33/48
U.S. Cl. 260—287 OX    11 Claims

ABSTRACT OF THE DISCLOSURE

The present invention relates to new 8-oxyquinolines of the formula

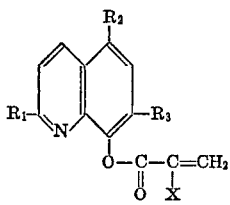

wherein
(a) X represents hydrogen or halogen and $R_1$ represents hydrogen or methyl, and the substituents $R_2$ and $R_3$ represent hydrogen or halogen, or wherein
(b) X represents methyl, $R_1$ represents hydrogen and one of the two substituents $R_2$ and $R_3$ denotes halogen and the other hydrogen, or both substituents $R_2$ and $R_3$ denote halogen, and in the case of (b) $R_1$, $R_2$ and $R_3$ represent substituents that differ from one another if $R_2$ represents chlorine or bromine, or wherein
(c) X represents methyl and $R_1$ represents methyl and $R_2$ and $R_3$ represent hydrogen or halogen, their process of manufacture and their use as active ingredient in pesticidal preparations.

---

The present invention relates to new 8-oxyquinoline acrylates and 8-oxyquinaldine acrylates respectively, and to their manufacture. The invention further relates to pesticidal compositions containing these compounds as active substance, also to the use of the compounds for combatting thallophytes.

The active substances correspond to the formula

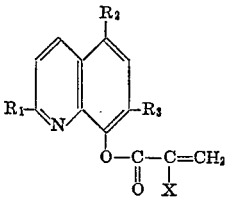

wherein
(a) X represents hydrogen or halogen and $R_1$ represents hydrogen or methyl, and the substituents $R_2$ and $R_3$ represent hydrogen or halogen, or wherein
(b) X represents methyl, $R_1$ represents hydrogen and one of the two substituents $R_2$ and $R_3$ denotes halogen and the other hydrogen, or both substituents $R_2$ and $R_3$ denote halogen, and in the case of (b) $R_1$, $R_2$ and $R_3$ represent substituents that differ from one another if $R_2$ represents chlorine or bromine, or wherein
(c) X represents methyl and $R_1$ represents methyl and $R_2$ and $R_3$ represent hydrogen or halogen.

By halogen is to be understood fluorine, chlorine, bromine, or iodine.

A particularly important group of compounds is that of formula (I), in which $R_1$, $R_2$ and $R_3$ have the meanings indicated and X denotes a hydrogen atom, or a bromine atom or a chlorine atom.

In this connection, those compounds are preferred in which X represents hydrogen, chlorine or bromine, $R_1$ represents hydrogen or methyl, and $R_2$ and $R_3$ each represents hydrogen, chlorine, bromine or iodine.

The polymerization possibilities of the individual methacrylates of 8-oxyquinoline have been investigated by Kirienko, Aristov and Schamschurin [J. Wsjesojusnaja obschtoschei Chimii No. 13,238–239 (1968)]. In doing so, they were able to determine connections between the kind of substitution of the aromatic nucleus and the tendency to autopolymerization.

The compounds of formula (I) according to the invention can be manufactured by one of the following methods without any tendency to become resinous.

The compounds can be manufactured by esterifying, in the usual way, a correspondingly substituted 8-oxyquinoline of the formula

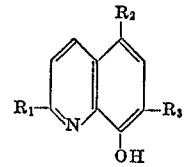

(II)

wherein $R_1$, $R_2$ and $R_3$ have the meanings as given for formula (I), with a reactive acrylic acid or methacrylic acid derivative, preferably the acid halide, or, if in the formula for the final products X=halogen, with a haloacrylic acid halide of the formula halogen—OC—CH=$CH_2$ or with a halopropionic halide of the formula halogen—OC—CHX—$CH_2$X wherein in the first case 1 mole H-halogen and in the second 1 mole H-halogen and subsequently or simultaneously 1 mole H—X is split off to form the double bond (in the presence of an acid-acceptor).

The compounds of formula (I), wherein X=halogen can also be manufactured by esterifying an 8-oxyquinoline of formula (II) with a reactive derivative of acrylic acid, preferably the acid halide, if the substituent X=halogen is introduced into the initially resulting product

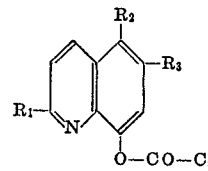

(III)

by the subsequent addition of one mole $X_2$ to the double bond and the splitting off one mole HX.

The subsequent halogen addition of the double bond is advantageously carried out in acetic acid as solvent. Substantially better yields and more homogeneous final products are obtained if, during the halogen addition, the basic function in the compound of formula III, i.e. the basic N atom of the oxyquinoline ring, is deactivated by means of protonization with a strong acid, for example, sulphuric acid.

The splitting off of one mole $X_2$ is effected by means of an alkali carbonate or alkali hydrogen carbonate, for example in aqueous methanol or acetone. Preferably, however, the splitting off of HX is effected by means of a suitable tertiary amine, for example, triethylamine, in inert, water-immiscible solvents, for example, benzene, toluene, xylene and the like. The tertiary amine can here be used in stoichiometric amount or in excess, in the process of which the HX salt of the tertiary amine is formed. It is, however, used preferably in an amount, for example, of 1–10% of the stoichiometric amount, with at least a stoichiometric amount of alkali hydroxide in the form of a strong, aqueous alkali lye, for example 4 N sodium hydroxide solution, being added in order to complete the splitting off of HX. The alkali lye reactivates the tertiary amine from its HX salt, which forms as an intermediate, so that catalytic amounts of tertiary amine suffice to carry out the reaction. By this method, the splitting off of HX takes place at ambient temperature quantitatively, rapidly and under mild conditions.

The compounds of formula I wherein X=halogen can be synthetized in a particularly satisfactory way in a single stage process. To this end the correspondingly substituted 8-hydroxyquinoline or 8-hydroxyquinaldine is reacted with the desired 2,3-dihalogenpropionic acid halide in an inert solvent, in the process of which a tertiary amine such, for example, a triethylamine, both binds the H-halogen resulting from the ester formation, and also effects within the propionic acid molecule the splitting off of HX, which leads to the α-haloacrylic acid bond. The reaction can be carried out under mild conditions.

If the process is caried out in a solvent in which the hydrogen halide salt of the tertiary amine is insoluble, but in which the desired reaction product is soluble (such, for example, as benzene, toluene etc.), then this salt of the amine can be separated in a simple manner by filtration. The compound of formula (I) with X-halogen is the obtained by evaporating the solvent or by precipitation.

The active substances of formula (I) can be used by themselves or in the form of agents for combating thallophytes. Besides the active substance, such agents contain in addition carriers, solvents, diluents, dispersing agents, emulsifiers, wetting agents, adhesives, thickeners and/or fertilizers, also other pecticides if necessary.

By thallophytes are to be understood chiefly lower organisms, such as bacteria and fungi.

The active substances of formula (I) possess very good activity against representatives of the class Phycomycetes, for example, phytopathogenic fungi such as Botrytis and Piricularia, but also against various other disease fungi in grain, maize, rice, vegetable, fruit and other cultures. The active substances of formula (I) may also be used as additives to soaps and detergents, since they combat skin fungi and are at the same time kind of the skin. They are particularly effective against the following species of fungi: *Cochliobolus miyabeanus, Corticium, Cerospora, Alternaria, Venturia inaequalis, Podosphaera leucotricha, Uromyces phaseoli, Cercospora apii, Cercospora beticola, Cercospora musae,* Piricularia sp., *Erysiphe cichoracearum, Penicillium digitatum, Sphaerotheca humuli, Diplocarpon rosae, Uncinula necator, Coccomyces hiemalis, Cladosporium carpophilum, Erysiphe graminis hordei, Monolinia* (Sclerotinia) *laxa, Monolinia* (Sclerotinia) *fructicola, Piricularia oryzae, Puccinia recondita, P. coronata, P. glumarum, Puccinia graminis tritici, Aspergillus niger, Aspergillus terreus,* Rhizoctonia, Fusarium, Verticillium.

The active substances of the invention have likewise a fungitoxic action on fungi that attack plants from the soil and partially cause tracheomycoses, such as *Fusarium cubense, Fusarium dianthi, Verticillium alboatrum* and *Phialophora cinerescens.*

The 8-oxyquinoline acrylates and 8-oxyquinaldine acrylates can be used in the usual formulations such, for example, as emulsion concentrates, wettable powders, pastes, soluble powders, dusting agents and granules. These are manufactured in the usual way, for example, by extending the active substances with solvents and/or carriers, optionally with the conjoint use emulsifiers and/or dispersing agents (cf. Agricultural Chemistry, March 1960, pages 35 to 38). Possible adjuvants are chiefly: solvents, for example, optionally chlorinated aromatic carbohydrates (for example, xylene, benzene, chlorobenzene), paraffins (for example, petroleum fractions), alcohols (for example methanol, ethanol, butanol), amines (for example ethanolamine, dimethylformamide and water; carriers, for example natural and synthetic stone powders (kaolin, diatomaceous earth, chalk, talc, highly dispersed silica, silicates); emulsifiers, such as non-ionic and anionic emulsifiers (for example polyoxyethylene fatty acid esters, polyoxyethylene fatty alcohol ethers, alkyl sulphonates and aryl sulphonates) and dispersing agents, for example lignin, sulphite waste lyes and methyl cellulose.

As has been mentioned already above, the active substances can be present in the previously mentioned formulations in mixtures with other known active substances. The formulations contain in general between 0.1 and 95% by weight of active substances, but preferably 0.5 to 90%.

The agents according to the invention, or their concentrations, are applied in the usual way, for example by squirting, spraying, dusting or sprinkling. The active substance can be used in a concentration of 5 to 0.00005%, depending on the purpose of the application. In especial cases, however, it is possible, or even necessary, to exceed this range of concentration or to go below it.

The active substances of formula (I) can also be mixed with other standard commercial fungicides; in doing so, a broadeing of the activity spectrum is obtained in many cases. However, in very many other cases synergistic effects are also obtained.

The following active substances are examples of those that can be used in admixture or conjunction with the compounds of formula (I):

INORGANIC SUBSTANCES

Elemental sulphur, ammonium polysulphide, sodium polysulphide, barium polysulphide, calcium polysulphide and calcium thiosulphate (lime sulphur), calcium hypochlorite, boric acid, sodium tetraborate-decahydrate (borax), zinc chloride, magnesium borate, nickel sulphate, potassium chromate, lead arsenate, cadmium chloride, and cadmium carbonate.

COPPER SUBSTANCES

Copper (I) oxide (cuprous oxide), Bordeaux mixture, copper (II) sulphate-pentahydrate (copper sulphate), basic copper (II) chloride (copper oxychloride), copper (II) phosphate, tribasic copper (II) sulphate (tribasic copper sulphate), basic copper (II) carbonate, copper (II) dihydrazine sulphate, a copper-amine complex, copper (II) sulphate/ammonium carbonate mixture, copper (II) chloride/basic copper (II) sulphate mixture, basic copper (II) carbonate/zinc salt mixture, copper (II)-zinc chromate complex (copper zinc chromate), copper (II)-zinc-cadmium-calcium chromate complex, copper (II) salt of oleic acid (copper oleate), a copper (II) salt of a fatty acid, copper (II) salt of naphthenic acid (copper naphthenate), copper (II) salt of 8-hydroxyquinoline (oxine copper), copper (II) salt of 1,2-naphthoquinone-oxime-(2), and copper (II) salt of 3-phenylsalicylate.

TIN AND MERCURY SUBSTANCES

Bis-(tri-*n*-butyl tin)oxide, triphenyl tin hydroxide (fentin hydroxide), triphenyl tin acetate (fentin acetate), bis-(tributyl tin)succinate, mercury (I) chloride (calomel), mercury (II) chloride (mercuric chloride), mercury (II) oxide, mercury-zinc chromate complex, mercury (II) lactate, ethylmercury chloride, 2-hydroxyethyl mercury acetate, ethylmercury isothiocyanate, 3-ethoxypropyl mercury bromide, chloromethoxypropyl mercury acetate, methoxyethyl mercury chloride, 2-methoxyethyl mercury silicate, bis-(methylmercury) sulphate, bis-(methylmercury) ammonium acetate, ethylmercury acetate, 2-methoxyethylmercury acetate, ethylmercury phosphate, isopropylmethylmercury acetate, methylmercury cyanide, methylmercury benzoate, N-cyano-N'-(methylmercury) guanidine,
methylmercury pentachlorophenolate,
ethylmercury-2,3-dihydroxypropyl mercaptide,
methylmercury-8-hydroxyquinolate (Ortho LM),
N-(methylmercury)-1,4,5,6,7,7-hexachlorobicyclo
[2,2,1]hept-5-ene-2,3-dicarboximide,
N-(ethylmercury)-1,4,5,6,7,1-hexachlorobicyclo[2,2,1]hept-5-ene-2,3-dicarboximide, sodium salt of ethylmercury thiosalicylate, N-(ethylmercury)-para - toluenesulphonic acid anilide, phenylmercury acetate (PAM), phenylmercury propionate, phenylmercury triethanolammonium lactate (PAS), phenylmercury urea, N-(phenylmercury) - 1,4,5,6,7,7-hexachlorobicyclo[2,2,1]hept - 5 - ene-2,3-dicarboximide-phenylmercury dimethyldithiocarbamate, phenylmercury formamide, phenylmercury chloride, phenylmercury acetate, phenylmercury benzoate, phenylmercury borate, phenylmercury hydroxide, phenylmercury iodide, basic phenylmercury nitrate, phenylmercury monoethanolamine lactate, phenylmercury salicylate, hydroxymercury chlorophenol, hydroxymercury trichlorophenol, hydroxymercury nitrophenol, N-phenylmercury ethylenediamine, phenylmercury monoethanolammonium acetate, pyridylmercury acetate, diphenylmercury-8-hydroxyquinolate, a mercury (II) complex with an organic phosphate, mixture of methylmercury-2,3-dihydroxypropylmercaptide and methylmercury acetate, mixture of hydroxymercury chlorophenol and hydroxymercury nitrophenol, and mercury-cadmium organic complex.

FURTHER ORGANIC METAL COMPOUNDS

Cadmium succinate, cadmium-di-$n$-propylxanthogenate, cadmium-8 - hydroxyquinolate, phenylaminocadmium acetate, phenylaminocadmium dilactate, methylarsine sulphide, zinc octate and zinc oleate.

SIMPLE ORGANIC COMPOUNDS (ALIPHATES)

Formalin, paraformaldehyde, acrolein, methyl bromide, methyl isothiocyanate, tetraiodoethylene, 1,3-dichloropropene and related chlorinated $C_3$ hydrocarbons, 1-chloro-3-bromopropene(1),
trans-1,4-dibromobutene(2),
1,3-dichloropropene(1),
1-chloro-2-nitropropene,
2-chloro-1-nitropropene trichloronitromethane,
dichlorotetrafluoro-acetone, sodium salt of propionic acid, calcium salt of propionic acid, chlorofumaric acid-bis-$\beta$-chloroethyl ester, sorbic acid and the potassium salt thereof, 2-propene-1,1-diol-acetate, 2-aminobutane, dodecylguanidine acetate (dodine), dodecylquanidine phthalate, $\alpha$-chloroacetyl-1,3-aminopropionitrile,
$\alpha$-bromoacetylvalinamide,
1,2-dichloro-1-(methylsulphonyl)ethylene,
1,2-dichloro-1-(butylsulphonyl)ethylene, and
trans-1,2-bis-($n$-propylsulphonyl)ethylene.

BENZENE DERIVATIVES

Para-dichlorobenzene, hecta-chlorobenzene (HCB), 1,2,4,5-tetrachloro-4-nitrobenzene (tecnazene), pentachloronitrobenzene (quintozene), 1,3,5-trichloro-2,4,6-trinitrobenzene, isomer mixture of 1,3,4-trichloro-2,6-dinitrobenzene and 1,2,3-trichloro-4,6-dinitrobenzene, 2,4,5,6-tetrachloroisophthalic acid nitrile, 2,4-dinitrophenylthiocyanate, diphenyl, ortho-nitrodiphenyl, 1-chloro-2,4-dinitronaphthalene, acenaphthene.

PHENOLS 2,4,6-trichlorophenol, 2,4,5-trichlorophenol, 2,4,5-trichlorophenyl acetate, 2,4,5-trichlorophenol chloroacetate, trichlorophenol zinc salt, meta-cresyl acetate, 2,3,4,6-tetrachlorophenol, pentachlorophenol (PCP), orthio-dihydroxybenzene, 2,4-dihydroxy-$n$-hexylbenzene, 2-phenylphenol (ortho-phenylphenol), 3,5-dibromosalicylic aldehyde, 2-benzyl-4-chlorophenol, 2,2'-dihydroxy-5,5'-dichlorodiphenylmethane (dichlorophene),
2,2'-dihydroxy-3,3',5,5'-6,6'-hexachlorodiphenylmethane,
2,2'-dihydroxy-5,5'-dichlorodiphenylsulphide,
2,2'-dihydroxy-3,3',5,5'-tetrachlorodiphenylsulphide,
2,2'-dihydroxy-3,3',5,5'-tetrachlorodiphenylsulphide disodium salt, 4-chloro-orthophenylphenol, 1,4-dichloro-2,5-dimethoxybenzene, salicylic anilide, bismuthsalicylate, trifluoromethylsalicyclic anilide halogenated with chlorine or bromine, brominated salicyclic anilide, and (3,5-dimethyl-4-chlorophenoxy)ethanol.

DINITROPHENOL DERIVATIVES 2-(1-methyl-$n$-propyl)-4,6-dinitrophenyl-2-methylcrotonate (binapacryl),
2-(1-methyl-$n$-propyl)-4,6-dinitrophenylisopropylcarbonate (dinobuton),
2-(1-methyl-$n$-heptyl)-4,6-dinitrophenylcrotonate dinocap),
methyl-2,6-dinitro-4-(1-ethylhexyl)phenylcarbonate+methyl-2,6-dinitro-4-(1-propylphenyl)phenylcarbonate (dinocton p),
4-nonyl-2,6-dinitrophenylbutyrate, and
S-methyl-2-(1-methyl-$n$-heptyl)-4,6-dinitrophenylthiocarbonate.

ANILINE DERIVATIVES 2,6-dichloro - 4 - nitroaniline (dichloran), 2-cyanoethyl - N - phenylcarbamate, propynyl-N-phenylcarbamate, and $\alpha$-(2-bromoacetoxy)-acetanilide.

QUINONE DERIVATIVES 2,3,5,6-tetrachlorobenzoquinone(1,4) (chloranil),
2,3-dichloronaphthoquinone(1,4) (dichlone),
2-amino-3-chloronaphthoquinone(1,4),
2,3,6,7-tetrachloro-4$\alpha$,8$\alpha$-epoxy-1,2,3,4,
4$\alpha$,8$\alpha$-hexahydro-1,4-methanonaphthalene-5,8-dione, and quinonoximebenzoylhydrazone (benquinox).

TRICHLOROMETHYLTHIO DERIVATIVES

N-(trichloromethylthio)phthalimide (folpet),
N-(trichloromethylthio)cyclohex-4-ene-1,2-dicarboximide (captan),
N-(1,1,2,2-tetrachloroethylthio)cyclohex-4-ene-1,2-dicarboximide (captafol),
N-methanesulphonyl-N-trichloromethylthio-para-chloroaniline,
N'-dichlorofluoromethylthio-N,N-dimethyl-N'-phenylsulphamide (dichlofluanid), and
S-(2-pyridyl-1-oxide)-S'-trichloromethyl disulphide; hydrochloride.

ORGANIC PHOSPHATES

O,O,O-trimethylthiophosphate,
O,O-diethylphthalimidophosphonothioate,
5-amino-bis-(dimethylamido)phosphinyl-3-phenyl-1,2,4-triazole (triamiphos),
5-methylamino-bis-(dimethylamido)phosphinyl-3-phenyl-1,2,4-triazole,
O,O-diethyl-O-2-pyrazinylphosphorthioate,
O-ethyl-S,S-diphenyldithiolphosphate, O-ethyl-S-benzylphenyldithiophosphonate, and
O,O-diethyl-S-benzylthiolphosphate.

DITHIOCARBAMATES

Zinc salt of dithiocarbazine acid, sodium-N-methyldithiocarbamate (metham), sodium-N-methoxyethyldithiocarbamate,
sodium-N,N-dimethyldithiocarbamate (DDC),
ammonium-N,N-dimethyldithiocarbamate,
zinc-N,N-dimethyldithiocarbamate (ziram),
iron-N,N-dimethyldithiocarbamate (ferbam),
copper-N,N-dimethyldithiocarbamate,
disodium-ethylene-1,2-bis-dithiocarbamate (nabam),
zinc-ethylene-1,2-bis-dithiocarbamate (zineb),
iron-ethylene-1,2-bis-dithiocarbamate,
manganese(II)-ethylene-1,2-bis-dithiocarbamate (maneb),
calcium-ethylene-1,2-bis-dithiocarbamate,
ammonium-ethylene-1,2-bis-dithiocarbamate,
zinc-propylene-1,2-bis-dithiocarbamate (mezineb) (propineb),
bis(dimethylthiocarbamyl)ethylene-1,2-bis-dithiocarbamate, complex consisting of (maneb) and zinc salt (mancozeb),
tetra-ethylthiuram monosulphide, bis-(N,N-dimethyldithiocarbamylmercapto)-methylarsine,
tetramethylthiuramdisulphide (thiram),
dipyrrolidylthiuramdisulphide,
N,N'-bis-(dimethylamino)thiuramdisulphide
polyethylenethiuramsulphide, and complex consisting of (zineb) and polyethylenethiuramdisulphide (metiram).

O-HETEROCYCLES

Bis-(3,4-dichloro-2(5)-furanoyl)ether (mucochloric anhydride), 2-methoxymethyl - 5 - nitrofuran, 5-nitrofurfuraldoxime-(2), 5-nitrofurfurylamideoxime - (2), and 1-hydroxy - 3 - acetyl - 6 - methylcyclohexene-(5)-dione-(2,4) (dehydroacetic acid).

1-N-HETEROCYCLES

3-[2-(3,5-dimethyl - 2 - hydroxycyclohexyl)-2-hydroxyethyl]glutarimide (cycloheximide), phthalimide, pyridine-2-thiol-1-oxide or 1-hydroxypyridine-2-thione, zinc salt of pyridine-2-thiol-1-oxide, manganese(I) salt of pyridine-2-thiol-1-oxide,
S-1(1-oxido-2-pyridyl)isothiuronium chloride,
α,α-bis(4-chlorophenyl)-3-pyridinemethanol (parinol),
8-hydroxyquinoline (8-quinolinol),
8-hydroxyquinoline sulphate (quinosol),
benzoyl-8-hydroxyquinoline salicylate,
3-(2-methylpiperidino)propyl-3,4-dichlorobenzoate,
6-ethoxy-1,2-dihydro-2,2,4-trimethylquinoline (ethoxyquin),
N-lauryl-isoquinolinium bromide,
9-(para-n-hexyloxyphenyl)-10-methylacridinium chloride, and
9-(para-n-hexyloxyphenyl)-10-methylacridinium-para-toluene sulphonate.

2- AND 3-N-HETEROCYCLES 2-n-heptadecylimidazolidine acetate (glyodine),
1-hydroxyethyl-2-heptadecylimidazolidine,
1-phenyl-3,5-dimethyl-4-nitrosopyrazole,
1-para-chlorophenyl-3,5-dimethyl-4-nitrosopyrazole,
1-para-sulphamylphenyl-3,5-dimethyl-4-nitrosopyrazole,
N-(1-phenyl-2-nitropropyl)piperazine,
2-dimethylamino-6-methyl-5-n-butyl-4-hydroxypyrimidine, N-dodecyl-1,4,5,6-tetrahydropyrimidine,
N-dodecyl-2-methyl-1,4,5,6-tetrahydropyrimidine,
2-n-heptadecyltetrahydropyrimidine,
1-(4-amino-4-propyl-5-pyrimidylmethyl)-2-methyl-pyridinium chloride hydrochloride,
2-(2'-furyl)benzimidazole (furidazole),
3-dodecyl-1-methyl-2-phenylbenzimidazolium ferricyanide,
methyl-N-benzimidazol-2-yl-N-(butylcarbamoyl) carbamate (benomyl),
2-(ortho-chloroanilino)-4,6-dichloro-sym.-triazine, and
2-ethylamino-6-methyl-5-n-butyl-4-hydroxypyrimidine.

S-HETEROCYCLES 5-chloro - 4 - phenyl-1,2-dithiol-3-one, 2,3-dicyano-1,4-dithia-anthraquinone (dithianone), and 2-(4-thiazolyl) benzimidazole.

NO-, NS-, AND OS-HETEROCYCLES 4-(2-chlorophenylhydrazono)-3-methyl-5-isoxazolone (drazoxolone),
thiazolidinone-4-thione-(2) (rhodanine),
3-(parachlorophenyl)-5-methylrhodanine,
3,5-dimethyltetrahydro-1,3,5-thiadiazine-2-thione (dazomet),
3,3'-ethylene-bis-(tetrahydro-4,6-dimethyl)-2H-1,3,5-thiadiazine-2-thione) (milneb),
3-benzylidene-amino-4-phenylthiazoline-2-thione,
6-chlorobenzthiazole-2-thiol zinc salt,
6-β-diethylamino-ethoxy-2-dimethylamino-benzthiazole dihydrochloride,
monoethanolammonium-benzthiazole-2-thiol,
laurylpyridinium-5-chloro-2-mercaptobenzthiazole,
zinc and sodium salts of 2-mercaptobenzthiazole and dimethyldithiocarbamate,
6-(β-diethylaminoethoxy)-2-dimethylaminobenzthiazole dihydrochloride,
3-trichloromethylthiobenzothiazolone,
3-trichloromethylthiobenzoxazolone,
3-(trichloromethyl)-5-ethoxy-1,2,4-thiadiazole,
6-methyl-2-oxo-1,3-dithiolo[4,5-b]-quinoxaline (quinomethionate),
2-thio-1,3-dithiolo[4,5-b]-quinoxaline (thioquinox),
2,3-dihydro-5-carboxanilido-6-methyl-1,4-oxathine,
3,3,4,4-tetrachlorotetrahydrothiophene-1,1-dioxide, and
2,3-dihydro-5-carboxanilido-6-methyl-1,4-oxanthine-4,4-dioxide.

QUATERNARY AMMONIUM COMPOUNDS

Cetyl-trimethylammonium bromide, n-alkyl($S_{12}$, $C_{14}$, $C_{16}$) dimethylbenzylammonium chloride, alkenyl-dimethylethyl-ammonium bromide, dialkyldimethylammonium bromide, alkyl-dimethylbenzylammonium chloride, alkyl $C_9$–$C_{15}$ tolylmethyltrimethylammonium chloride, di-isobutylcresoxyethyldimethyl - benzylammonium chloride, para-di-isobutylphenoxyethoxy-ethyldimethylbenzylammonium chloride, and benzoyltrimethylammonium bromide.

FUNGICIDAL ANTIBIOTICS

Gliotoxin, 2,4-diquanidino-3,5,6-trihydroxycyclohexyl 5-deoxy-2-O-(2-deoxy-2-methylamino-α-L - glucopyranosyl) 3-C-formyl-β-L-lyxopentanofuranoside (streptomycin), 7-chloro-4-6-dimethoxycoumarin-3-one-2-spiro-1'-(2'-methoxy-6'-methylcyclohex - 2'-en-4' - one) griseofulvin),
4-dimethylamino1,4,4α,5,5α,6,11,12α-octahydro-3,5,6,10,12α-hexahydroxy-6-methyl-1,11-dioxo-2-naphthacenecarboximide (oxytetracycline),
7-chloro-4-dimethylamino-1,4,4α,5,5α,6,11,12α-octahydro-3,6,10,12,12α-pentahydroxy-6-methyl-1,11-dioxo-2-naphthacenecarboximide (chlorotetracycline),
(pimaricin), (lancomycin), (phleomycin), (kasugamycin), (phytoactin), D(—)-threo-2,2-dichloro-N-[β-hydroxy-α-(hydroxymethyl)-paranitrophenethyl]aretamide (chloramphenicol), and
blasticidine-S-benzylaminobenzene-sulphonate.

MISCELLANEOUS SUBSTANCES

N-(3-nitrophenyl)itaconimide,
phenoxyacetic acid,
sodium-para-dimethylaminobenzenediazosulphonate,
acroleine-phenylhydrazone,
2-chloroacetaldehyde(2,4-dinitrophenyl)-hydrazone,
2-chloro-3-(tolylsulphonyl)-propionitrile,
1-chloro-2-phenylpentanediol(4,5)-thione(3),
para-nonyl-phenoxypolyethyleneoxyethanol-iodine complex,
(α-nitromethyl-ortho-chlorobenzylthioethylamine hydrochloride,
3-(para-tert.-butylphenylsulphonyl)acrylonitrile,
octachlorocyclohexanone,
pentachlorobenzyl alcohol, pentachlorobenzyl acetate,
pentachlorobenzaldehyde cyanohydrin,
2-norcamphanemethanol,
2,6-bis-(dimethylaminomethyl)-cyclohexanone,
decachloro-octahydro-1,3,4-methano-2H-cyclobuta[cd]-pentalen-2-one,
1-3-chloroallyl)-3,5,7-triaza-1-azoiaadamantane chloride,
coal tar, and
blast furnace tar.

MIXTURES

Nickel sulphate/maneb mixture, maneb/mercaptobenzthiazole mixture, zineb/mercaptobenzthiazole mixture, zineb/nickel (II) chloride mixture, zineb/nickel (II) sulphate mixture, ziram/basic copper sulphate mixture, ziram/zinc/mercaptobenzthiazole mixture, thiram/cadmium hydrochloride mixture, thiram/hydroxymercury chlorophenol mixture, thiram/phenylmercury acetate mixture, polyethylene/bis-thiouram sulphide/copper oxychloride mixture,
methylarsine/bis-(dimethyl-dithiocarbamate)/ziram/thiram mixture,
folpet/phenylmercury acetate mixture,
dodine/ferbam/sulphur mixture, diethianone/copper oxychloride mixture, dichlone/ferbam/sulphur mixture, dinocap/dinitrooctylphenol mixture, captan/quintozene/tribasic copper sulphate mixture,
cadmium propionate/phenylmercury propionate mixture, formaldehyde/urea mixture and phenylammonium cadmium dilactate/phenylmercury formamide mixture.

EXAMPLE 1

Manufacture of oxyquinoline acrylates 1 kg. of 5-chloro-7-bromo-8-oxyquinoline (3.87 mols) were stirred in 4 liters of benzene and mixed with 0.411 kg. of distilled triethylamine (4.06 mol).

While stirring thoroughly 0.353 kg. of acrylic chloride (3.90 mols) dissolved in 1 litre of benzene was allowed to run in over the course of half an hour. The mixture was subsequently further stirred for 1 hour at 70° C. internal temperature, cooled to room temperature and the crude product was filtered with suction from the precipitated triethylamine hydrochloride.

400 ml. of sodium hydroxide solution was added to the filtrate and the mixture stirred for 42 hours, so that both phases were thoroughly mixed with each other. Thereafter the unchanged 5-chloro-4-bromo-8-oxyquinoline was collected by suction filtration from the Na salt (approx. 80 g.).

The phases in the filtrate were separated. The benzene phase was neutralized by stirring with 3×300 ml. of water, treated with activated charcoal and dried over Na₂SO₄, whereupon the solvent was removed in a rotary evaporator.

1.066 kg. (=88% of theory) of active substance No. 1

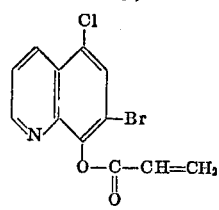

was obtained in the form of a crystalline residue. Melting point after recrystallization 100.5–101.5° C.

The compound can be recrystallized from cyclohexane (1 g./approx. 4 ml.) or from a large quantity of petroleum ether; it occurs in the form of large crystals.

The substances of the formula

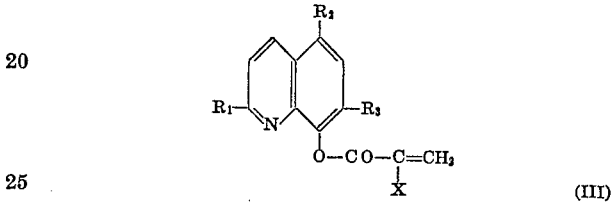

are obtained in analogous manner.

| Compound number: | R₁ | R₂ | R₃ | X | Phys. constant |
|---|---|---|---|---|---|
| 2 | H | Cl | Cl | H | M.P. 80–81° C. |
| 3 | H | Cl | I | H | M.P. 102–103° C. |
| 4 | H | Cl | H | H | M.P. 78–80° C. |
| 5 | H | Br | Br | H | M.P. 114–116° C. |
| 6 | H | J | H | H | M.P. 118–120° C. |
| 7 | H | H | H | H | M.P. 51–52° C. |
| 8 | CH₃ | Cl | Cl | H | M.P. 77–79° C. |
| 9 | CH₃ | H | H | H | B.P.₁₀ 176–178° C. |
| 10 | CH₃ | Br | H | CH₃ | M.P. 58–61° C. |
| 11 | CH₃ | Br | Br | CH₃ | M.P. 75–78° C. |
| 12 | H | Cl | Br | CH₃ | M.P. 74–75° C. |
| 13 | H | Cl | I | CH₃ | M.P. 93–95° C. |
| 14 | H | J | I | CH₃ | M.P. 111–113° C. |
| 15 | CH₃ | H | H | CH₃ | M.P. 68–70° C. |
| 16 | CH₃ | Cl | Cl | CH₃ | M.P. 80–82° C. |

EXAMPLE 2

Manufacture of oxyquinoline-2-bromoacrylates 8.17 g. of sulphuric acid (96%) dissolved with ice-cooling in 40 ml. of glacial acetic acid.

The solution (a) was slowly added with ice-cooling and stirring to 50 g. of active substance No. 1, dissolved in 140 ml. of glacial acetic acid. Thereafter 25.8 g. of bromine was dissolved in 30 ml. of glacial acetic acid at room temperature and while cooling with water from the exterior. This solution was added dropwise with stirring over the course of 1 hour (change in color to red), and the mixture stirred for a further 2 hours at room temperature, in the process of which there occurred a strong brightening of color to light yellow. The solvent was subsequently distilled off in a rotary evaporator under a water jet vacuum at a bath temperature of 40–50° C.

The distillation residue (approx. 100–110 g.) containing glacial acetic acid was stirred with 200 ml. of benzene and the resulting suspension stirred into 250 ml. of 4 N sodium hydroxide solution at room temperature while agitating the mixture vigorously. The self-heating that occurs in the process was compensated by addition of ice. The mixture was agitated for a further ¼ hour, thereafter 2 ml. of triethylamine were added and stirring was continued for ½ hour, so that the two phases were thoroughly mixed with each other. After filtration by suction, the filtrate was given a final wash with a little benzene. The phases in the filtrate were separated. The benzene phase was washed with 2×100 ml. of water (in the course of which it remained alkaline), treated with a sufficient amount of Na₂SO₄ and 20 g. of activated charcoal (strong brightening of color) and the solvent distilled off in a rotary evaporator.

After recrystallization from cyclohexane (=70% of theory) of active substance No. 17

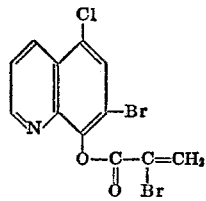

was obtained (M.P. 110–112° C.).

EXAMPLE 3

126 parts of 1,2-dibromopropionyl chloride in 200 parts by volume of toluene were added dropwise over the course of half an hour to 72 parts of 5-chloro-8-hydroxy quinoline and 100 parts of triethylamine in 1000 parts by volume of toluene, in the process of which the temperature rose to 55° C. After two hours, the precipitated triethylamine hydrochloride and triethylamino hydrobromide were filtered off and the filtrate concentrated in a rotary evaporator under reduced pressure. By adding 200 parts by volume of petroleum ether (boiling point 50–70° C.) and scratching with a glass rod, the reaction product of the formula

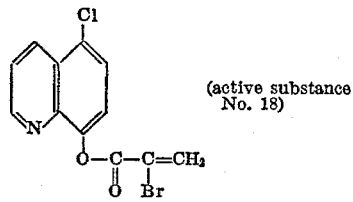

(active substance No. 18)

was obtained in crystalline form.

Melting point: 100–103° C.; 116 g. (93% of theory relative to the 5-chloro-8-hydroxyquinoline).

The substances of the formula

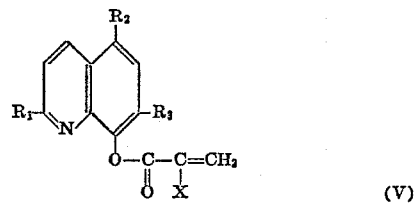

(V)

| Compound Number: | $R_1$ | $R_2$ | $R_3$ | X | Phys. property |
|---|---|---|---|---|---|
| 19 | H | Cl | Cl | Br | M.P. 99–100° C. |
| 20 | H | H | H | Br | M.P. 84–86° C. |
| 21 | H | Br | Br | Br | M.P. 108–110° C. |
| 22 | H | Cl | I | Br | M.P. 145–149° C. |
| 23 | H | J | I | Br | M.P. 119–122° C. |
| 24 | $CH_3$ | H | H | Br | M.P. 49–51° C. |
| 25 | H | Cl | H | Cl | M.P. 84–87° C. |
| 26 | H | Cl | Cl | Cl | M.P. 98–100° C. |
| 27 | H | Cl | Br | Cl | M.P. 97–101° C. |
| 28 | H | Cl | I | Cl | M.P. 129–131° C. |
| 29 | H | H | H | Cl | M.P. 68–72° C. |
| 30 | H | Br | Br | Cl | M.P. 109–113° C. |

EXAMPLE 4

20 g. of active substance are dissolved in a mixture of 48 g. of diacetone alcohol, 16 g. of xylene and 16 g. of an anhydrous high molecular condensation product of ethylene oxide with a mixture of higher fatty acids. This concentrate can be diluted with water to given fungicidal emulsions or liquid sprays of every desired concentration.

EXAMPLE 5

80 g. of active substance are mixed with 2–4 g. of a wetting agent, for example the sodium salt of an alkyl-polyglycolether-monosulphate, 1–3 g. of a protective colloid, for example sulphite waste lye, and 15 g. of an insert, solid carrier such, for example, as kaolin, bentonite, chalk or diatomaceous earth, and subsequently ground fine in a suitable mill. The resulting wettable powder, stirred into water, yields a very stable fungicidal suspension.

EXAMPLE 6

5 g. of active substance are mixed and ground with 95 g. of calcium carbonate. The product is used as a fungicidal scattering preparation.

EXAMPLE 7

5 g. of active substance are mixed with 95 g. of a pulverulent carrier, for example sand or calcium carbonate, and moistened with 1–5 g. of water or isopropanol. The mixture is subsequently granulated. Before granulation, a multiple amount, for example 100–900 parts of an optionally water-soluble artificial manure, as, for example ammonium sulphate, can be mixed with the above mixture or with a mixture rich in active substance, for example a mixture of 10 g. of active substance and 90 g. of calcium carbonate.

EXAMPLE 8

20 g. of active substance and 80 g. of talc are very finely ground in a ball mill. The resulting mixture is used as fungicidal dusting agent.

EXAMPLE 9

A fungicidally active solution that can be emulsified in water is obtained by mixing 50 g. of active substance, 45 g. of xylene, 2.5 g. of an ethylene oxide condensation product of an alkyl phenol and 2.5 g. of a mixture of the sodium salts of dodecyloxyethyl sulphuric acid.

EXAMPLE 10

Tomato plants were raised in a greenhouse and sprayed once prophylactically with an aqueous liquid spray containing 0.1% of active substance No. 17 and prepared according to Example 4. Two days afterwards, the so-treated plants were infected with conidia of *Alternaria solani* (E. et M.) J. et Gr. and kept for 2 days in a humidity chamber. After a further 2 days of subsequent incubation in a greenhouse, 5% of the plants treated with the test preparation were attacked by fungi; whereas the untreated plants were 100% attacked.

EXAMPLE 11

Rice plants were raised in a greenhouse and sprayed once prophylactically with an aqueous spray containing 0.1% of active substance and prepared according to Example 4. Two days afterwards, the so treated plants were infected with conidia of *Piricularia oryzae* Bri. et. Cav. After 7 days incubation in a humidity chamber, the treated plants were attacked by fungi as follows, whereas the untreated test plants were 100% attacked:

| Compound number: | Attack, percent |
|---|---|
| 20 | 10 |
| 18 | 10 |
| 27 | 5 |
| 5 | 5 |
| 30 | 10 |
| 6 | 5 |
| 23 | 5 |
| 16 | 10 |

EXAMPLE 12

Zucchetti plants were raised in a greenhouse and sprayed once prophylactically with an aqueous liquid spray containing 0.1%, 0.01% or 0.001% of an active substance and prepared according to Example 4. Two days later, the so treated plants were infected with spores of *Erysiphe cichoriacearum* D.C. After 12–14 days, the treated plants showed only slight signs of attack by fungi at the concentrations indicated, whereas the untreated test plants were 100% attacked:

| Compound number: | Concentration, percent | Attack, percent |
|---|---|---|
| 18 | 0.1 | 10 |
| 19 | 0.01 | 5 |
| 1 | 0.001 | 5 |
| 17 | 0.01 | 5 |
| 27 | 0.01 | 5 |
| 3 | 0.001 | 5 |
| 13 | 0.01 | 5 |
| 5 | 0.01 | 5 |
| 21 | 0.01 | 5 |
| 30 | 0.01 | 5 |
| 6 | 0.01 | 5 |
| 16 | 0.01 | 5 |

EXAMPLE 13

Bean plants were raised in a greenhouse and sprayed once with an aqueous spray containing 0.1% of active substance and prepared according to Example 4. Two days later, the so treated plants were infected with uredo spores of *Uromyces phaseoli* (Pers.) Wint. and kept for 48 hours in a humidity chamber. After 10 to 14 days of subsequent incubation in the greenhouse, the treated plants were attacked by fungi as follows, whereas the untreated test plants were 100% attacked:

| Compound number: | Attack, percent |
|---|---|
| 7 | 5 |
| 20 | 5 |
| 4 | 5 |
| 18 | 5 |
| 2 | 5 |
| 19 | 5 |
| 1 | 5 |
| 27 | 5 |
| 3 | 5 |
| 22 | 5 |
| 5 | 5 |
| 21 | 5 |
| 30 | 5 |
| 9 | 10 |
| 24 | 5 |
| 8 | 5 |

EXAMPLE 14

Three fully developed leaves of equal size of *Vicia faba*, which were sprayed in an atomizer until droplets formed with a spray containing 0.1% content of active substance manufactured from the active substance No. 30 formulated as 10% spraying powder (10 WP), were each placed in Petri dishes provided with moistened filter paper. When the leaves were again dry, they were infected with a freshly prepared, standardized spore suspension of the fungus (concentration: 100,000 spores/ml.) and kept for 48 hours in a humid atmosphere at 20° C. After this time had elapsed, the leaves exhibited initially dot shaped spots that rapidly spread. The number and size of the infected areas served as a basis for evaluating the activity of the test substance. Whereas the untreated test leaves showed 100% attack, only 5% of those treated with compound No. 30 were attacked.

EXAMPLE 15

The anti-bacterial activity was determined in the dilution test as follows:

Bacteriostasis and bactericidal effect (a) 20 mg. of active substance was dissolved in 10 ml. of propyleneglycol, of which solution 0.25 ml. was added to 4.75 ml. of sterile glucose broth and then further diluted 1:10 in a test tube. These solutions were then inoculated with a bacterium and incubated (bacteristasis) for 48 hours at 37° C. Twenty-four hours later, 1 platinum wire loop full of inoculated solution was smeared on glucose-agar plates and incubated for 24 hours at 27° C. (bactericidal effect). After this time had elapsed, the following limiting concentrations of the bacteriostasis or of the bactericide respectively were ascertained in p.p.m.:

| Compound number | 2 | 19 | 1 | 17 | 20 | 18 |
|---|---|---|---|---|---|---|
| Bacterium: | | | | | | |
| Trich. mentagrophytes | | 10 | | | | |
| Ps. aeruginosa | | 500 | | | | |
| Rhiz. nigricans | | | | 10 | 30 | 10 | 10 |
| Asp. niger | <3 | | 10 | <3 | 10 |
| Esch. coli | <3 | 10 | <3 | 10 |
| Staph. aureus | 10/30 | 2 | 10/10 | 30/~30 | 30/~100 | 100/~100 |
|  | 3/10 | 3 | 10/~10 | 30/~30 | 30/30 | 3/3 |

(b) Determination of the minimal inhibiting concentration (MIC) against bacteria and fungi in the gradient plate test:

The compounds of formula (I) were mixed in suitable formulations (for example as solutions in dimethylsulphoxide) of certain concentration with warm meat broth-agar. The liquid mixtures were poured into a solidified, wedge-shaped (=diminishing thickness of layer) basic agar layer, and likewise left to congeal.

Bacteria cultures were then applied in a line vertically to the gradient with the aid of a Pasteur pipette. After an incubation of 24 hours at 37° C., the point on the layer is determined at which growth inhibition is attained with the slightest concentration of active substance (in p.p.m.).

The following minimal inhibition concentration, expressed in p.p.m. of active substance, was attained in respect of the bacteria strains listed in the table:

| Bacteria or fungus cultures resp. | Compound number | | | |
|---|---|---|---|---|
|  | 2 | 1 | 17 | 18 |
| Paecilomyces varioti | 10 | 20 | 6 | 3 |
| Trichophyton tinactin res | | 1 | 2 | 3 |
| Trichophyton metagrophytes | 10 | 1 | 4 | 2 |
| Trichophyton interdigitale | 10 | 1 | 3 | 2 |
| Aspergillus elegans | | 25 | 6 | 3 |
| Sacaromyces cerevisiae | | 10 | 4 | 5 |
| Rhodotorula rubra | 10 | | | |
| Cadida albicans | 10 | 20 | 4 | 4.5 |
| Pseudomonas aeruginosa | >100 | 60 | 70 | 100 |
| Proteus vulgaris | 10 | 25 | 30 | 40 |
| Klebsiella pneumoniae | | 20 | 30 | 60 |
| Salmonella typhimurium | | 25 | 30 | 50 |
| Escherichia coli | 6.5 | 15 | 25 | 25 |
| Streptococcus mitis | 1 | 0.5 | 0.5 | 0.7 |
| Staphylococcus aureus | 5.5 | 10 | 20 | 3 |

What is claimed is:
1. Compounds of the formula

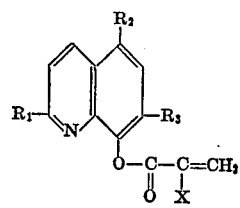

wherein

X is hydrogen or halogen and $R_1$ is hydrogen or methyl, and each of $R_2$ and $R_3$ is hydrogen or halogen.

2. Compounds as claimed in claim 1, wherein X is hydrogen, chlorine or bromine, and each of $R_2$ and $R_3$ is hydrogen, chlorine, bromine or iodine.

3. The compound of the formula

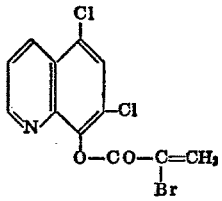

as claimed in claim 1.

4. The compound of the formula

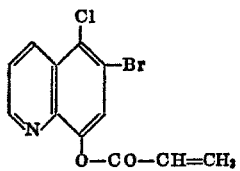

as claimed in claim 1.

5. The compound of the formula

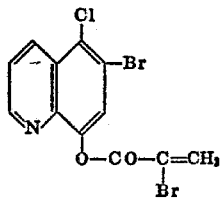

as claimed in claim 1.

6. The compound of the formula

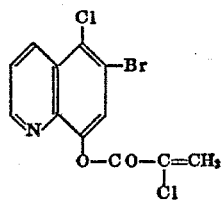

as claimed in claim 1.

7. The compound of the formula

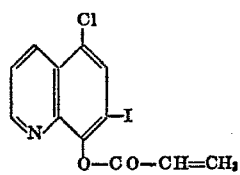

as claimed in claim 1.

8. The compound of the formula

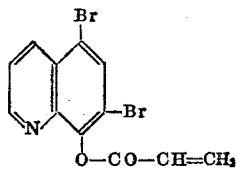

as claimed in claim 1.

9. The compound of the formula

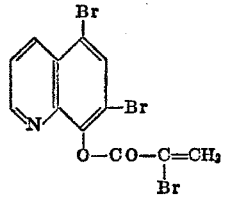

as claimed in claim 1.

10. The compound of the formula

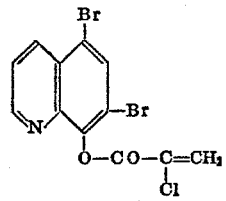

as claimed in claim 1.

11. The compound of the formula

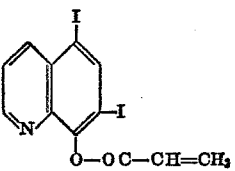

as claimed in claim 1.

References Cited

UNITED STATES PATENTS

| | | | |
|---|---|---|---|
| 3,056,790 | 10/1962 | Cannon | 260—287 R |
| 2,666,058 | 1/1954 | Neher | 260—287 |
| 3,297,525 | 1/1967 | Grier | 260—287 |

OTHER REFERENCES

Kirienko et al. in Chem. Abstr., vol. 72, col. 100459m (May 1970).

Kirienko et al. in Chem. Abstr., vol. 69, col. 59069g (1968).

Kirienko et al. III Khim. Geterotsikl. Soedin, vol. 1969, pp. 823–6 (1969).

Kirienko et al. III Zh. Vses. Khim. Obschest, vol. 1967, pp. 700–1 (1967).

DONALD G. DAUS, Primary Examiner

U.S. Cl. X.R.

260—270 R, 289 OX; 424—258

UNITED STATES PATENT OFFICE
CERTIFICATE OF CORRECTION

Patent No. 3,813,399    Dated May 28, 1974

Inventor(s) Helmut Huber-Emden et al.

It is certified that error appears in the above-identified patent and that said Letters Patent are hereby corrected as shown below:

In Claims 4, 5 and 6, the formulae should appear as follows:

4. 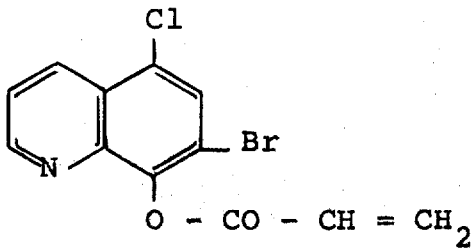

5. 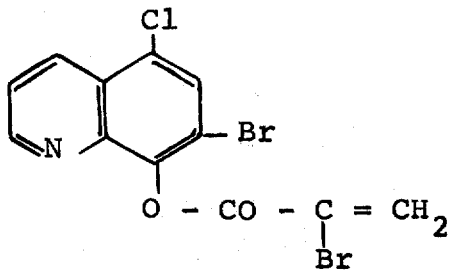

6. 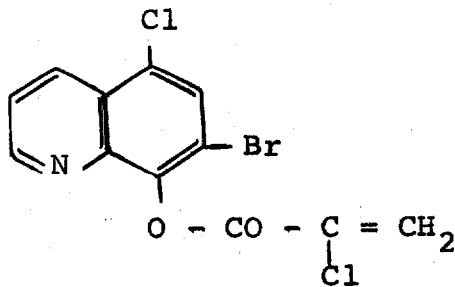

Signed and sealed this 17th day of December 1974.

(SEAL)
Attest:

McCOY M. GIBSON JR.           C. MARSHALL DANN
Attesting Officer             Commissioner of Patents